United States Patent [15] 3,646,254
Illetschko et al. [45] Feb. 29, 1972

[54] METHOD AND APPARATUS FOR INDICATING THE PHASE DISPLACEMENT OF THE COLOR-SYNCHRONIZING SIGNAL OF A COLOR TELEVISION SIGNAL

[72] Inventors: Gerhard Illetschko, Darmstadt; Horst Peth, Alsbach an der Bergstrasse, both of Germany

[73] Assignee: Fernseh GmbH, Dormstadt, Germany

[22] Filed: June 23, 1969

[21] Appl. No.: 835,450

[30] Foreign Application Priority Data

June 22, 1968 Germany ......................P 17 69 468.9

[52] U.S. Cl. ..........................................178/5.4, 178/5.4 TE
[51] Int. Cl. .........................................................H04n 9/02
[58] Field of Search...............................................178/5.4 T

[56] References Cited

UNITED STATES PATENTS 3,310,625 3/1967 Boyin et al. ............................178/5.4
3,437,745 4/1969 Haferl.................................178/5.4 P
2,858,368 10/1958 Kennedy.............................178/6 TT

*Primary Examiner*—Richard Murray
*Assistant Examiner*—Barry Leibowitz
*Attorney*—Michael S. Striker

[57] ABSTRACT

One of the two differently directed modulating components are alternatingly suppressed during predetermined time intervals. Both components are traced superimposingly on the screen of an oscilloscope tube so that they appear simultaneously visible in a level oscillogram. The amplitude difference of the components appearing on the screen is a measure of the phase displacement. Adders combine the identifying pulses with the components of the video frequency color signals, and modulators modulate the resulting combined components onto the color carrier. After combining the outputs of the modulators in an adder, the combined signal is applied to an oscilloscope or viewing.

7 Claims, 5 Drawing Figures

Patented Feb. 29, 1972 3,646,254

Inventors:
Gerhard Illetschko
Horst Peth by Michael J. Striker
Attorney

METHOD AND APPARATUS FOR INDICATING THE PHASE DISPLACEMENT OF THE COLOR-SYNCHRONIZING SIGNAL OF A COLOR TELEVISION SIGNAL

BACKGROUND OF THE INVENTION

The present invention resides in a method for indicating the phase response of the color synchronizing signal of PAL color television signal, through an oscilloscope.

As known in the art of PAL color television systems, two color signals are quadrature modulated upon a color carrier. One of the two modulation axes is switched through 180° at the line frequency. The reference phase for the color carrier is transmitted by the color synchronizing signal which consists of a color carrier pulse of about 10 color carrier cycles upon the back porch of each line-synchronizing pulse. The color-synchronizing signal is, at the same time, used for transmitting the position or phase of the switched modulation axis. The color-synchronizing signal exhibits, in this regard, sequentially following line periods of different phase relationships. These line periods of different phase, differ by a phase angle of 90°.

The phase angle of the color synchronizing signal amounts to +135° with respect to the modulation axis for the color difference signal B-Y (U). This phase angle prevails in those line periods, in which the modulation axis for the color-difference signal R-Y (V) is positively directed. The phase angle is −135° within those line periods, in which the color difference signal V is directed negatively. As a result, the color-synchronizing signal contains, in all line periods, a component along the negative direction of the color-difference signal B-Y. In those line periods in which a positive switching phase lies before the color-difference signal R-Y, the color-synchronizing signal contains a component along the positive direction of the color-difference signal R-Y. For line periods with negative switching phase, the component along the negative modulation direction of the color-difference signal R-Y applies. Accordingly, the color-synchronizing signal is composed of two components in the direction of the modulation axes −U and V. The components in the V direction vary in phase by 180° in sequentially following line periods. As a result a line frequency is realized with phase angle of ±45° in relationship to the modulation axis U in the negative direction of the modulated color-synchronizing signal. The phase difference of 90° between the phase angle of the color-synchronizing signal in sequentially following line periods, is to be held to a small tolerance of less than, for example, 2°.

In the past, the setting and monitoring of the phase relationship of the color-synchronizing signal, was accomplished with the aid of a vectorscope. The latter is a conventional but specialized oscilloscope or oscillograph in which the signals are represented as vectors upon the screen of the oscilloscope tube. The diagrammatic representation of the vectors indicates the amplitude as well as the relative phase of the signals. The accuracy measurement for the phase angle in vectorscope used for color television, however, is approximately of the same magnitude as the required narrow top tolerance for the phase angle between the alternating color synchronizing signals of the PAL color television system. A vectorscope, furthermore, is a relatively complex measuring device.

Accordingly, it is an object of the present invention to monitor and set the phase angle of a phase alternating color-synchronizing signal of a PAL color television signal, through a level type of measurement.

It is furthermore an object of the present invention, to realize such level measurement with the aid of a simple level oscilloscope with high accuracy.

In one method for indication of the phase shift of the color-synchronizing signal of a PAL color television signal, through the use of an oscilloscope, one of the two components along the different modulation direction (U,V) becomes alternatingly suppressed. Both components are, furthermore, traced superimposingly upon the screen of the oscilloscope tube. The arrangement is such that the two components may be visually observed simultaneously so that their amplitude difference is a measurement for the phase shift.

The alternating suppression of the two components of the color-synchronizing signal can be realized in any desired time intervals. The suppression of one component of the color-synchronizing signal occurs preferably in each second line period.

SUMMARY OF THE INVENTION

A method and arrangement for indicating the phase displacement of the color-synchronizing signal of a PAL color television signal. One of the two differently directed modulated components in the U and V direction, are alternatingly suppressed during predetermined time intervals. Both components are traced superimposingly on the screen of an oscilloscope tube of a level oscilloscope, so that they appear simultaneously visible. The amplitude difference of the components appearing on the screen of the oscilloscope, is a measure of the phase displacement to be measured.

The identifying pulses are added to the components of the video-frequency color-type signals through the use of two adders. Electronic switches interrupt the identifying pulses before being applied to the adders, through square-shaped switching pulses which actuate the electronic switches. These electronic switches function in the form of gates which transmit or conduct when square wave pulses are applied. The action of the electronic switches is such that one switch is closed while the other is opened. Two modulators modulate the output components of the adders onto the color carrier which is phase displaced. For the U associated component, for example, the color carrier is displaced by 90°, whereas for the V- associated component, the color carrier is displaced to 0° and 180° in phase. The outputs of the two modulators are combined in a separate adder, and the output of this adder is displayed upon the screen of an oscilloscope to which timing signals are applied synchronously with the switching pulses which actuate the electronic switches.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
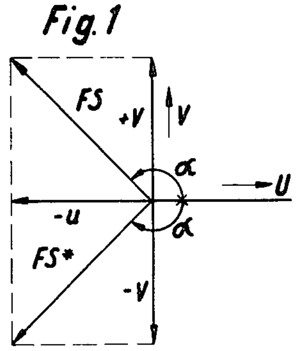
FIG. 1 is a vector diagram of a phase-alternating color-synchronizing signal which is free of errors.

Referring to the drawing and in particular to FIG. 1, the color-synchronizing signal FS is realized from the vectorial sum of two components directed along the modulation axes V and U. The color synchronizing signal contains a component of constant magnitude $-u$ directed along the negative U-axis, in all line periods. The second component which lies along the V-axis changes its algebraic sign with every succeeding line period. The color synchronizing signal FS has a positive component along the modulation axis V, in the line periods with positive switching phase for the color difference signal R-Y. In the line periods with negative switching phase for the color difference signal R-Y, the component along the V-axis is negatively directed. When combined with a negative u component, $-u$, the vector sum results in a complex color synchronizing signal FS*. The complex vector FS* is conjugate with respect to the color-synchronizing signal FS.

If the component $-u$ along the negative U axis is precisely equal to the positive or negative component along the V-modulation axis, the resultant vector FS or FS* forms an angle of 45° with any one of the components. As a result, the phase angle $\alpha$ shown in FIG. 1 between the positive modulation axis U and the color-synchronizing signal FS and FS*, has the predetermined value of ±135°.

Figure 2:
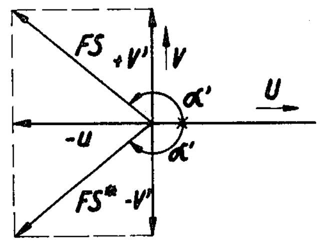
FIG. 2 is a vector diagram of a phase-alternating color-synchronizing signal with phase-angle error.

When the magnitude of the two components along the V- and U-modulation axes are not equal, the resultant arrangement is shown in FIG. 2. Thus, in this diagram, the components $-u$ and $+v'$ or $-v'$ are not identical in magnitude as for the situation of FIG. 1. The component $-u$ of the color-synchronizing signal FS and FS*, however, is made identical in magnitude to the corresponding component of FIG. 1. The components $+v'$ and $-v'$ along the V-axis, on the other hand, are made smaller than the magnitude of the component $-u$. Accordingly, the angle $\alpha'$ between the positive modulation axis U and the color synchronizing signal vector FS and FS*, is no longer of the previous magnitude of ±135°. Instead, this angle $\alpha'$ has a value exceeding ±135°. Thus, the angle between the color-synchronizing signal vector and the negative direction of the modulation axis U is less than ±45°, and therefore the angle $\alpha'$ is greater than ±135°. When, on the other hand, the component $-u$ is smaller than the component lying along the V-modulation axis, the angle between the vector FS and FS*, and the negative U-axis is greater than ±45°. The phase shift adjustment of the preceding angles may be accomplished in the following manner:

The components along the V- and U-axes of the color-synchronizing signal, are varied relative to each other. During such variation, the normal phase displacement of ±45° prevails if the magnitude of the two components are identical. In accordance with the present invention, this characteristic is used for adjusting and monitoring the phase movement of the phase alternating color-synchronizing signal in the PAL color television system. The adjustment and monitoring may be carried out with the aid of a simple oscillograph or oscilloscope, with substantial accuracy. In this regard, in accordance with the present invention, one of the two components of different modulation directions is alternately suppressed during predetermined time intervals. With reference to FIGS. 1 and 2, for example, the component $-u$ is suppressed during one-time interval, so that the components $+v$ or $-v$ is made available for that time interval. In the subsequent time interval the component $-v$ or $-V$ is suppressed and, accordingly, the component $-u$ is made available. The two alternately succeeding components $-u$ and $\pm v$ are traced upon the fluorescent screen of the oscilloscope, in superimposed manner. Due to the visual persistence characteristic of the human eye, and the persistence of the fluorescent material upon the screen of the tube of the oscilloscope, the oscillograms of both of these components become simultaneously visible. This situation prevails provided that the time intervals in which the components are made alternately available, do not exceed a predetermined duration of approximately one-twentieth of a second. The duration of the time intervals can be varied within wide limits, as desired, below this value of one-twentieth of a second. In order to simplify performance of the method, according to the present invention, it is desirable or appropriate to select the time intervals in relation to the video or picture frequency, and the line-changing frequency of the standard resolution of the color television signal. Thus, the time intervals may, for example, correspond to one-half of a picture duration which is one-fiftieth of a second. The time intervals may, however, be also selected smaller than the duration of one-fiftieth of a second for the purpose of suppressing the components of the color-synchronizing signal during a large number of line periods. Such suppression is performed a number of times in each component picture period. The alternate suppression of the components can also be accomplished at the line frequency.

Figure 3:
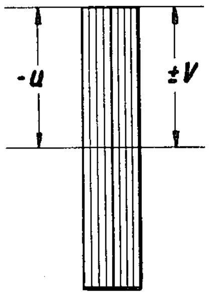
FIG. 3 is a schematic representation of the level oscillogram of the components of the color-synchronizing signal of FIG. 1.

When the magnitudes of the components $-u$ and $\pm v$ of the color-synchronizing signal are identical, the oscillogram of FIG. 3 results. In this situation, the oscillograms of the two superimposed signals which are traced upon the fluorescent screen, exhibit the same height and are bounded at the upper and lower ends by a common line. Under these conditions, the color-synchronizing signal exhibits the correct phase shift of ±45° with respect to the negatively directed modulation axis U.

Figure 4:
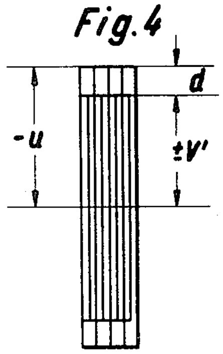
FIG. 4 is a schematic representation of the level oscillogram of the color-synchronizing signals of FIG. 2.

When the magnitudes of the signals $-u$ and $\pm v'$ are of different amplitudes, in accordance with FIG. 2, the oscillogram of FIG. 4 results. In this oscillogram, the superimposed tracing of the two signals is bounded at the top and bottom by the double line, because the height of the oscillograms is unequal for the two signals. The appearance of such a double line in the oscillogram, therefore, indicates that the two components $-u$ and $\pm v'$ are of different amplitudes, so that the phase shift of the color-synchronizing signal deviates from the prescribed value of ±45° relative to the negatively directed modulation axis U. The amount of space $d$ between the two lines of the double contour on the oscillogram, represents a measure of deviation of the phase shift from the prescribed value of ±45°. The accuracy in measurement, in accordance with the method described above, is substantially better than the permissible tolerance in the phase displacement of, for example, ±2°. The accuracy in measurement, furthermore, is greater than that prevailing in conjunction with a conventional vectorscope. Assuming, for example, an oscillogram height of 50 mm., the amplitude difference $d$, in FIG. 4, between the oscillograms of the two components of the color-synchronizing signal, is 0.9 mm. for a phase shift deviation of 1° from the desired or prescribed value. In spite of this substantially small difference, the oscillogram can be readily resolved, because the human eye is sensitive to the occurrence of a double contour at the upper and lower limits of the oscillogram, rather than a single contour.

Figure 5:
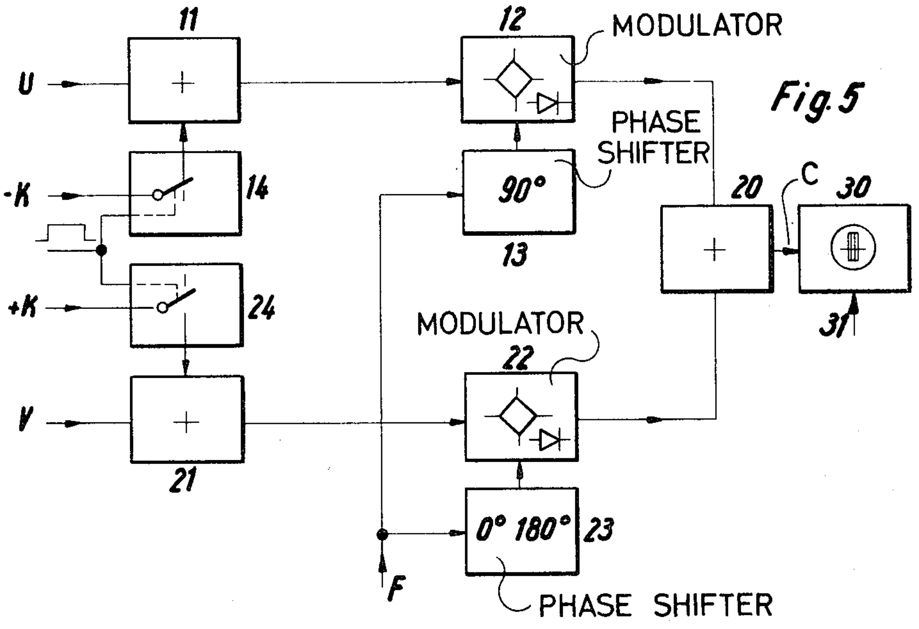
FIG. 5 is a block schematic diagram of an arrangement carrying out the method, in accordance with the present invention.

FIG. 5 is a functional block diagram of a color modulator used to carry out the method of the present invention. The color difference signals U (B-Y) and V (R-Y) are applied to adders or adding stages 11 and 21, respectively. The outputs of these two adders 11 and 21 are applied, respectively, to modulators 12 and 22 in which the color difference signals modulate the 90° phase-displaced color carrier oscillation. In the PAL system, the color carrier F is applied to the modulator 22 in alternate phase and opposite phase relationship at line frequency. The color carrier F is also applied to the modulator 12 through a phase shifter 13 with 90° phase shift. An adder or adding stage 20 combines the output of the modulators 12 and 22 which are the carrier frequency color difference signals. At the output of the adder 20, appears a carrier frequency quadrature modulated chrominance signal C. The identifying pulse K (burst flag pulse) of the PAL color television system is added to the video frequency color difference signals U and V in the adders 11 and 21, with negative and positive polarity, respectively.

Electronic switches 14 and 24 are included in the paths of the identifying pulses −K and +K applied to the adders 11 and 21. These electronic switches aid in carrying out the measurement in accordance with the method of the present invention. When no measurement of the phase shift is to be carried out, in the operative state, both of the electronic switches 14 and 24 are closed. As a result, the identifying pulses K (burst flag pulses) are applied continuously to the adding stages 11 and 21.

To further increase the accuracy of measurement, the amplitudes of the identifying pulses can be chosen so as to be greater during the measuring time than when in the operative state, i.e., the pulses can be amplified, prior to application to the inputs of the adders 11 and 21. The amplitudes of the signals on the oscillogram can be correspondingly increased. When resorting to this method rather than the one in which the signals are amplified by increasing the gain of oscilloscope-disturbing factors are advantageously avoided. Thus, for example, disturbances caused by residual carriers or by inaccurate 90° phase adjustment of the two modulation axes, are less apparent.

To indicate the phase shift of the color-synchronizing signal upon the level oscilloscope 30, according to the present invention, the electronic switches 14 and 24 are alternatingly opened and closed for predetermined time intervals. The alternate switching or connecting or disconnecting of the identifying pulse K is preferably performed in succeeding line periods. Such alternate switching and disconnecting of the identifying pulse K may be accomplished by controlling the electronic switches 14 and 24 through oppositely phase rectangular voltages corresponding to the line duration. The blocking voltage may, for example, be a voltage at half the line frequency. The switch 14, for example, is closed during the positive rectangular voltage, whereas the switch 24 is opened. In the subsequent negative half cycle of the control voltage, the reverse situation prevails and switch 14 is opened while switch 24 is closed.

A timing signal for the oscilloscope 30 is applied at the input 31. Such timing signal may be in the form of a sawtooth oscillation at line frequency which serves to deflect the oscilloscope 30 as a function of time. Accordingly, the component $-u$ and $\pm v$ of the color-synchronizing signal will appear alternatingly in the color television signal during the time interval that the color-synchronizing signal prevails. This condition will occur in succeeding line periods upon the fluorescent screen of the oscilloscope 30. As described above, the amplitude difference between the two signals which seem to appear simultaneously on the oscilloscope, is a measure for the deviation of the phase shift of the color-synchronizing signal from the normal value of $\pm 45°$ with respect to the negative modulation U-axis.

It will be understood that each of the elements described above, or two or more together, may also find a useful application in other types of constructions differing from the types described above.

While the invention has been illustrated and described as embodied in phase response indications of the color-synchronizing signals, it is not intended to be limited to the details shown, since various modifications and structural changes may be made without departing in any way from the spirit of the present invention.

What is claimed as new and desired to be protected by Letters Patent is set forth in the appended claims:

1. Method for measuring the phase-angle relative to a reference phase of the swinging burst in a PAL television signal, said burst having a $u$ component at 180° to said reference phase and a $v$ component at 90° relative to said $u$ component comprising, in combination, the steps of alternately suppressing said $u$ and $v$-components during predetermined time intervals, thereby furnishing a partially suppressed burst having remaining $u$ and $v$-components alternating in time; and furnishing a visual image of the amplitude of said $u$ and $v$-components as a function of time, the amplitude difference between said components constituting a measure of said phase angle.

2. A method as set forth in claim 1, wherein said $u$ and $v$-components are alternately suppressed during successive line intervals.

3. Arrangement for measuring the phase-angle relative to a reference phase of the swinging burst in a PAL-television signal, comprising, in combination, first adder means having a first input receiving a first color difference signal, and a second input; second adder means having a first input receiving a second color difference signal, and a second input; means furnishing burst flag pulses of opposite polarity alternately to said second input of said first adder means and said second input of said second adder means; means furnishing a chrominance subcarrier signal; first phase shift means phase-shifting said chrominance subcarrier signal by 90°, thereby furnishing a first phase-shifted chrominance subcarrier signal; first modulator means having a first input connected to the output of said first adder means, a second input connected to the output of said first phase shift means, and an output furnishing a first modulator output signal; second phase shift means connected to said means for furnishing a chrominance subcarrier signal, said second phase shift means phase-shifting said chrominance subcarrier signal alternately by 0° and 180° and furnishing a second phase-shifted subcarrier signal at a second phase shift output; second modulator means having a first input connected to the output of said second adder means, a second input connected to said second phase shift output, and a second modulator output furnishing a second modulator output signal; third adder means having a first input connected to said first modulator output, a second input connected to said second modulator output, and an adder output furnishing a carrier frequency chrominance signal; oscilloscope means having a signal input connected to said third adder output, said oscilloscope means furnishing horizontal deflection signals in response to externally applied synchronizing signals and vertical deflection signals corresponding to signals applied at said signal input; and means furnishing said externally applied synchronizing signals to said oscilloscope means in synchronism with said means furnishing said burst flag pulses to said second inputs of said first and second adder means.

4. Arrangement as set forth in claim 3, wherein said means furnishing burst flag pulses alternately to said second inputs of said first and second adder means comprise means furnishing burst flag pulses of a first polarity; first switching means applying said first flag pulses of said first polarity to said second input of said adder means when closed; means furnishing burst flag pulses of opposite polarity to said first polarity; second switching means applying said burst flag pulses of opposite polarity to said second input of said second adder means when closed and means alternately closing said first and second switching means for predetermined time periods.

5. The arrangement as defined in claim 4 wherein said burst flag pulses have a greater amplitude during measurement of said phase displacement than their amplitude in the operative condition.

6. The arrangement as defined in claim 4 wherein said first and second switching means comprises electronic switches.

7. An arrangement as set forth in claim 6, further comprising means furnishing rectangular pulses for operating said first and second switching means.

* * * * *